US006997260B1

(12) United States Patent
Trader et al.

(10) Patent No.: US 6,997,260 B1
(45) Date of Patent: Feb. 14, 2006

(54) METHOD OF REPAIRING TUBULAR MEMBERS ON OIL AND GAS WELLS

(76) Inventors: Bruce Trader, 100 Lighthouse Point, Slidell, LA (US) 70458; George Hofmeister, 222 Venus Dr., Lafayette, LA (US) 70501

( * ) Notice: Subject to any disclaimer, the term of this patent is extended or adjusted under 35 U.S.C. 154(b) by 0 days.

(21) Appl. No.: 10/383,233

(22) Filed: Mar. 6, 2003

(51) Int. Cl.
*E21B 29/10* (2006.01)
*F16L 55/17* (2006.01)

(52) U.S. Cl. .................. 166/277; 166/75.13; 166/298; 166/367; 166/364; 138/99; 405/216

(58) Field of Classification Search ................ 166/277, 166/297, 298, 381, 382, 55, 75.11, 93.1, 94.1, 166/96.1, 367, 75.13, 75.14, 177.4, 242.1, 166/359, 364; 138/99; 405/195.1, 211, 405/216

See application file for complete search history.

(56) References Cited

U.S. PATENT DOCUMENTS 967,952 A 8/1910 Moran
1,198,649 A * 9/1916 Moser ........................ 277/337
1,947,413 A * 2/1934 Hay .............................. 249/1
2,373,885 A 4/1945 Gast et al.
2,593,725 A * 4/1952 Brown ....................... 166/277
2,687,177 A * 8/1954 De Camp .................. 166/76.1
2,889,885 A * 6/1959 Hildebrandt ................ 166/361
2,907,351 A * 10/1959 Rohrback et al. ............. 285/55
3,316,963 A * 5/1967 Boldrick et al. ............ 166/298
3,611,736 A * 10/1971 Goodman ................... 405/231
3,736,759 A 6/1973 Blose
4,019,301 A 4/1977 Fox
4,023,374 A 5/1977 Colbert et al.
4,068,483 A 1/1978 Papworth
4,114,388 A 9/1978 Straub
4,116,013 A 9/1978 Hellmers
4,306,821 A 12/1981 Moore
4,439,070 A * 3/1984 Dimmick .................... 405/216
4,644,722 A * 2/1987 Phillips ....................... 52/514
4,779,389 A * 10/1988 Landers .................. 52/169.13
4,876,896 A 10/1989 Snow et al.
4,892,410 A 1/1990 Snow et al.
4,941,775 A 7/1990 Benedict
4,993,876 A 2/1991 Snow et al.

(Continued)

FOREIGN PATENT DOCUMENTS

EP 0480686 A1 * 4/1992

(Continued)

*Primary Examiner*—Jennifer H Gay
(74) *Attorney, Agent, or Firm*—Garvey, Smith, Nehrbass & North, L.L.C.; Charles C. Garvey, Jr.

(57) ABSTRACT

The disclosure concerns a method and apparatus for repairing or structurally reinforcing an oil and gas well tubular member, or an assembly of tubular members. The assembly to be repaired can include a smaller diameter inner flow conveying conduit (or production tubing) and a larger diameter concentrically placed surface casing, providing an annulus in between the production tubing and the surface casing. A third casing pipe of largest diameter, the drive pipe is placed around the surface casing string. Other "conductor" casing pipes can be positioned around the surface casing inside the drive pipe. Part of the surface casing string (or other conductor pipe) can suffer damage due to corrosion. A sleeve or repair member is placed around the casing string or other tubular member at a damaged portion.

39 Claims, 7 Drawing Sheets

U.S. PATENT DOCUMENTS

| | | | | |
|---|---|---|---|---|
| 5,345,972 | A * | 9/1994 | Goglio et al. | 138/99 |
| 5,380,131 | A * | 1/1995 | Crawford | 405/216 |
| 5,388,317 | A * | 2/1995 | Johansen et al. | 29/402.18 |
| 5,591,265 | A | 1/1997 | Tusch | |
| 5,722,463 | A * | 3/1998 | Smyth et al. | 138/170 |
| 6,536,991 | B1 | 3/2003 | Trader et al. | |

FOREIGN PATENT DOCUMENTS

| | | |
|---|---|---|
| GB | 2255583 | 11/1992 |
| JP | 61-10634 | 1/1986 |
| JP | 61-155521 | 7/1986 |
| JP | 2-140322 | 5/1990 |

* cited by examiner

METHOD OF REPAIRING TUBULAR MEMBERS ON OIL AND GAS WELLS

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to a new method and apparatus that does not mandate the use of a drilling rig for repairing and structurally reinforcing tubular members that are next to a casing head assembly on an oil or gas well, and in one embodiment, casing string (or other conductors) contained inside of an outer drive pipe.

2. General Background of the Invention

In the oil and gas well drilling and production industry, casing arrangements are typically used as part of a well. These casing arrangements often include a smaller diameter inside production casing contained concentrically within the bore of a larger diameter surface casing string. There may be additional casing strings referred to as conductors. The outer most casing is referred to as a drive pipe. The production tube, surface casing, and conductors if present, are concentrically placed inside of an outermost drive pipe or like tubular member. A casing head assembly is provided at the top of the surface casing or conductor string. A grout filler often occupies the annulus that is in between the outer drive pipe and the inner casing strings to an elevation, if in a marine environment, somewhere in between the mud line and casing head assembly.

Such an assembly of drive pipe, casing strings, typically extend between the casing head assembly, which is what the wellhead or blow out preventor attaches to, and the oil or gas reservoir.

Moisture can accumulate from condensation, rain, etc. in between the outer drive pipe and inner casing string at the uppermost elevation. This creates a corrosion cell that can structurally weaken or perforate the conductor or surface casing. Often there are multiple conductors (in addition to the surface casing string) that are in between the outer drive pipe and the innermost production tubing. If there is only one conduit in between the outer drive pipe and the inner production tubing, it is typically referred to as the surface casing. Additional conduits in this area between outer drive pipe and surface casing are referred to as conductors. Historically, mobilization of a drilling rig has been required whenever repairs to one of the gas or oil well casing strings is needed.

Patents have issued that relate generally to the concept of a method and apparatus for protective encapsulation of structural members.

One early patent is the Papworth U.S. Pat. No. 4,068,483 entitled "Protective Sheath for Water-Eroded Wood Piling". In the Papworth patent, the sheath is for a water-eroded wood piling. The sheath is a longitudinally split, flexible and resilient plastic casing with overlapping circumferentially end segments. The casing has a preformed, integral spout at its upper end into which wet concrete can be poured to fill the casing around the eroded section of the piling. Flexible bands clamp the casing tightly around the piling, and the spout has aligned openings in its opposite sides for passing the uppermost one of these bands. The casing may comprise two or more longitudinal sections in overlapped sealed engagement with each other end-to-end for enclosing a long eroded section of the piling.

In the Colbert U.S. Pat. No. 4,023,374, there is disclosed a repair sleeve for a marine pile and a method of applying same. The '374 patent discloses a preformed molded fiberglass resin plastic repair sleeve for use on a marine or other submerged concrete pile and a method of applying the same. The sleeve is provided with at least one vertical seam consisting of inside interlocking reentrant bends which together establish an interlocking tongue and groove joint. The joint is maintained effective by self-tapping screws which are in engaged relation with steel closure clips or strips. The sleeve after assembly is centered about the pile undergoing repair and the continuous space which exists between the sleeve and the pile is filled with a suitable grout which, when hardened, encompasses the internal or inside portions of the joint under pressure and prevents unfastening of the seam. The vertical longitudinal extend of the sleeve is somewhat greater than the water depth of the partially submerged pile to which it is applied and, where a cylindrical concrete pile is concerned, the sleeve is molded on an arcuate bias so as to present an open gap enabling the sleeve to be readily slipped sidewise onto the pile by one or more divers and the gap thereafter closed in order to effect the interlocked joint. Where a square pile is undergoing repair, the sleeve assumes a conformable four-sided shape or, alternatively, it may be formed of two mating right-angle sleeve sections having a pair of vertical inside interlocking joints or seams between their adjoining side margins.

The Straub U.S. Pat. No. 4,114,388 discloses a device for protecting a pile from ice formations collecting on it and subsequently abstracting the pile as a result of a variation of tide level including a tapered guard member secured to the pile. The guard member is firmly secured to the pile by interconnecting stiffening members, horizontal stiffening rings, vertical fin members and compression rings which also serve to prevent deformation of the guard member taper as a result of interaction with the ice formations. The guard member comprises two sections connected by vertically extending tongue and groove joints.

The Moore U.S. Pat. No. 4,306,821 discloses a system for the restoring and reconditioning of structural piling. The system provides an outer form which is attachable to a portion of the piling which has been eroded or corroded and has lost some of is thickness and thus its overall strength. A diameter building filler is placed into the intraform space between the form and the piling, the filler providing a protective and structural coating to that portion of the piling where corrosion or damage has taken place. In the preferred embodiment, the filler is a setting material such as a suitable epoxy.

Three patents have issued to Richard Snow and Milton Ellisor. These patents include U.S. Pat. Nos. 4,876,896; 4,892,410; and 4,993,876. The '896 and '410 patents discloses a method and apparatus for forming an encapsulation or encasement about a structural member that is said to be suited for use in a marine environment. A two-component polymer system for protective and repair encapsulation is pumpable in two separate strings to the location of the structural member to be encapsulated. The two reactive components are combined in a static mixer immediately prior to be injected within the surrounding translucent jacket. By combining the reactive components immediately prior to use, premature setup is avoided and the resulting grout may be directed to flow upwardly in the jacket for enhancing final properties. By suitable coloring of the components, visual monitoring of the final mixing and distribution in the translucent form or jacket of the encapsulation material may be monitored. A field test for determining bond strength of the encapsulation polymer to the structural member is also disclosed in the '876 patent and in the '410 patent. The '896 patent discloses a method of testing protective encapsulation of structural members.

The above discussed patents all relate primarily to coatings for protecting against corrosive effects of the surrounding marine environment. However, the prior art fails to address a problem of structural reinforcement for structural members that have become weak because of the corrosive and/or mechanical effects of the surrounding environment. Further, these patented prior art systems do not address concentric, pipe within pipe configurations.

Other patents that discuss repair methods are the Fox U.S. Pat. No. 4,091,301 and the Moran U.S. Pat. No. 967,952, both references cited in U.S. Pat. No. 6,536,991 naming applicants herein as inventors. U.S. Pat. No. 6,536,991 is incorporated herein by reference.

BRIEF SUMMARY OF THE INVENTION

The present invention provides a method of repairing an oil or gas well having a platform that has an outer drive pipe, an inner production flow line, and one or more intermediate conductors or surface casing strings that are concentrically positioned in between the inner production flow line and the outer drive pipe.

The repair method of the present invention identifies a corroded or other damaged portion of the intermediate conductor or conductors or casings. As part of the method of the present invention, a section of the drive pipe is removed to provide an upper cut edge.

A sleeve or other repair member (e.g. half sleeve, quarter sleeve, curved plate) is installed that spans between upper and lower positions that are above and below the damaged section of the surface casing string (or conductor). The sleeve that is installed over the damaged section can have a longitudinal slot or slots that enable it to be open for installation on the casing string. The sleeve can be metallic or non-metallic (e.g., composite).

If the sleeve is metallic, it can be welded to the selected casing or conductor with preferably upper and lower girth welds. The sleeve slots are then closed with longitudinally extending welds or connections. If the sleeve is of a precured composite material, it can be secured about the damaged section using an adhesive. Additionally, the composite repair may be formed in place where the reinforcement material and resin are combined on site. In this case, the resin that makes the composite rigid is also the adhesive.

The sleeve can be comprised of two sleeve sections, each having a transverse semicircular shape. When two metallic sleeve sections are used, there are two slots and each of the slots is closed with a longitudinal weld or connection.

In one embodiment, there are two sleeves, an inner sleeve that is connected to or welded to the surface casing or conductor and an outer sleeve that is connected to or welded to the outer drive pipe.

A grout product (e.g., epoxy, polymeric, or cement grout) can be added to the annulus between outer drive pipe and inner conductor or casing string. Multiple embodiments of the method of the present invention are disclosed. In keeping with the method of the present invention, a repair could include any figure shown and described herein of FIGS. 1–15 or a combination of multiple of the drawing FIGS. 1–15, and corresponding descriptions. This repair method of the present invention restores structural integrity as well as pressure containment/load capacity for the casing or conductor that is repaired and thus to the casing string assembly below the casing head assembly.

BRIEF DESCRIPTION OF THE DRAWINGS

For a further understanding of the nature, objects, and advantages of the present invention, reference should be had to the following detailed description, read in conjunction with the following drawings, wherein like reference numerals denote like elements and wherein.

DETAILED DESCRIPTION OF THE INVENTION

Figure 6:
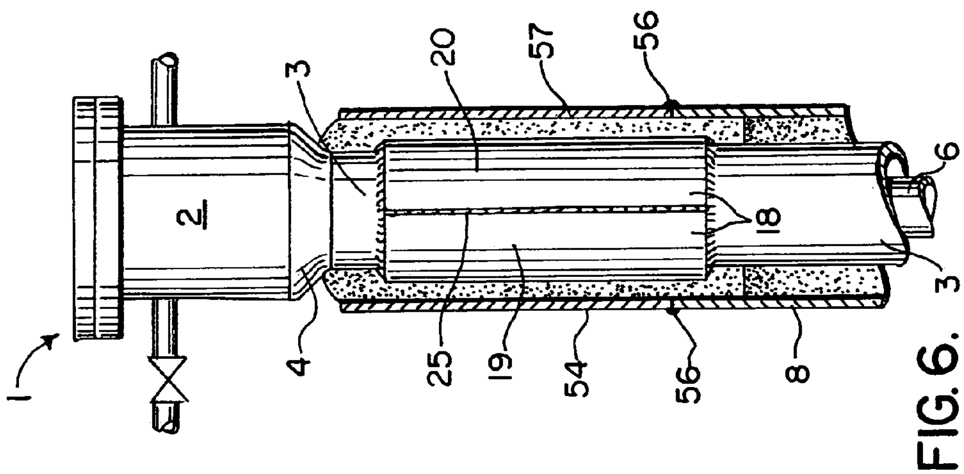
FIG. 6 is a partial sectional elevation view showing a second embodiment of the method and apparatus of the present invention, illustrating a method step of the present invention.

FIGS. 1–4 show the preferred method and apparatus of the present invention. A second embodiment of the method and apparatus of the present invention is shown in FIGS. 5 and 6. A third embodiment of the method and apparatus of the present invention is shown in FIGS. 7–10.

Figure 11:
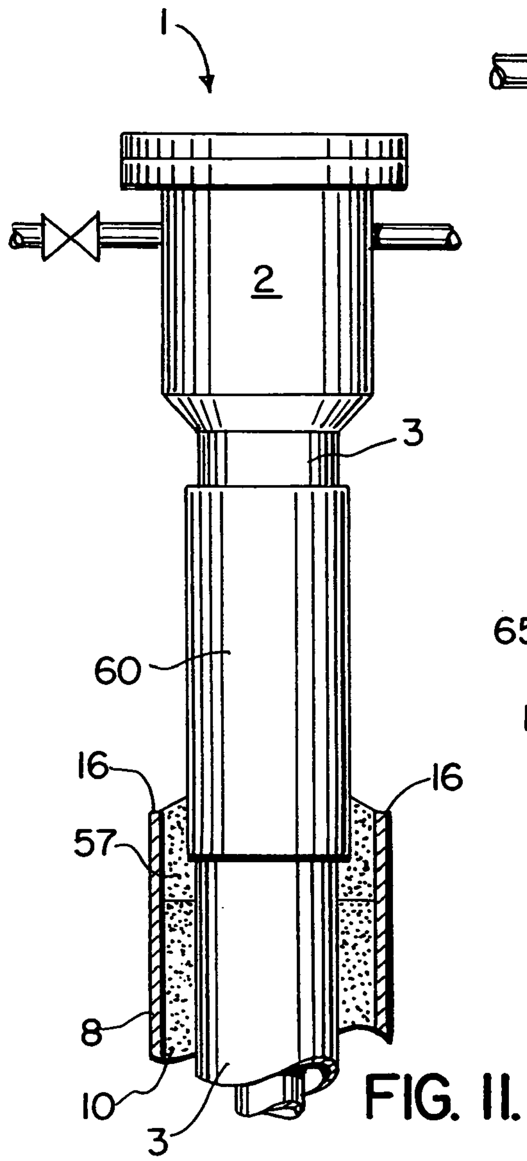
FIG. 11 is a partial sectional elevation view of the fourth embodiment of the method and apparatus of the present invention.
Figure 12:
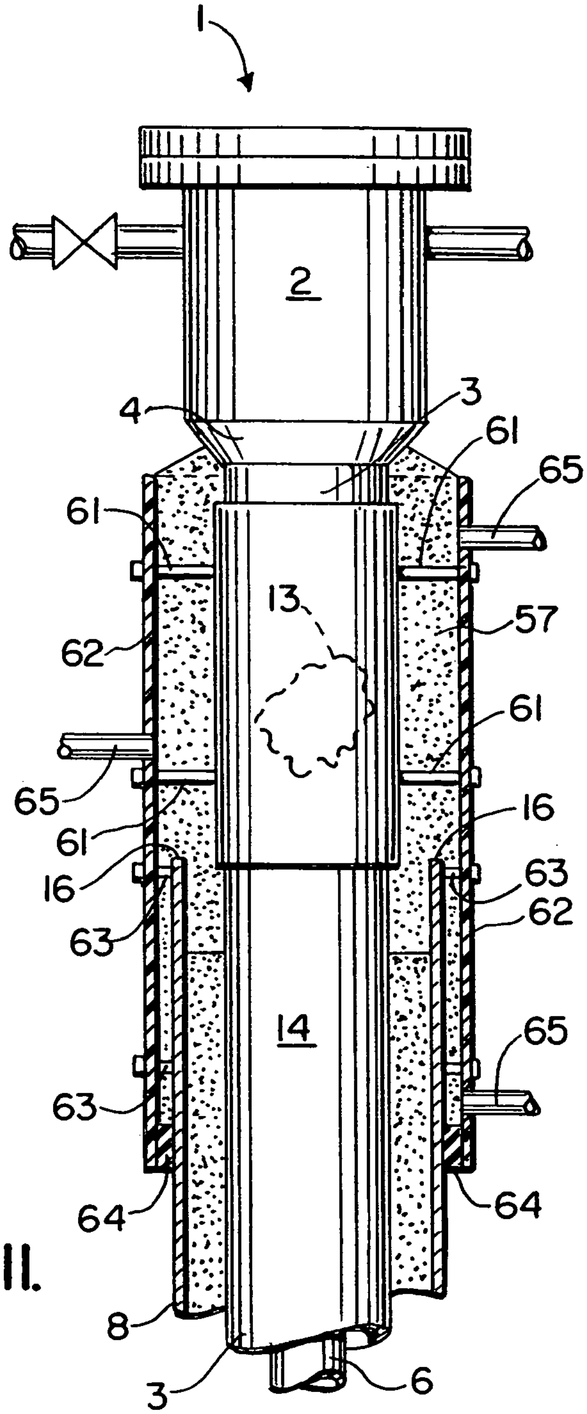
FIG. 12 is a sectional elevation view of a fifth embodiment of the method and apparatus of the present invention, illustrating a method step of the fifth embodiment.

A fourth embodiment of the method and apparatus of the present invention is shown in FIG. 11. A fifth embodiment of the method and apparatus of the present invention is shown in FIG. 12.

Figure 15:
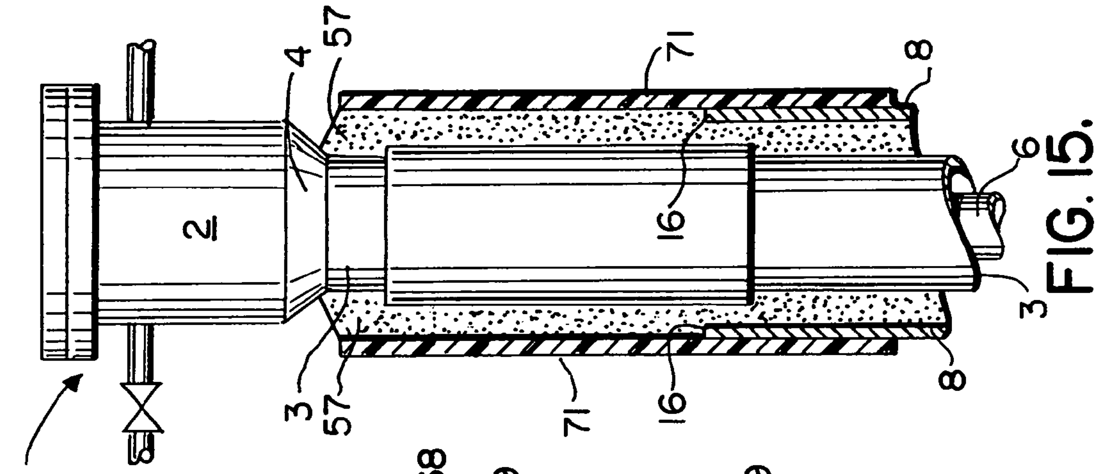
FIG. 15 is a partial sectional elevation view of the sixth embodiment of the method and apparatus of the present invention, illustrating a method step of the sixth embodiment.
Figure 14:
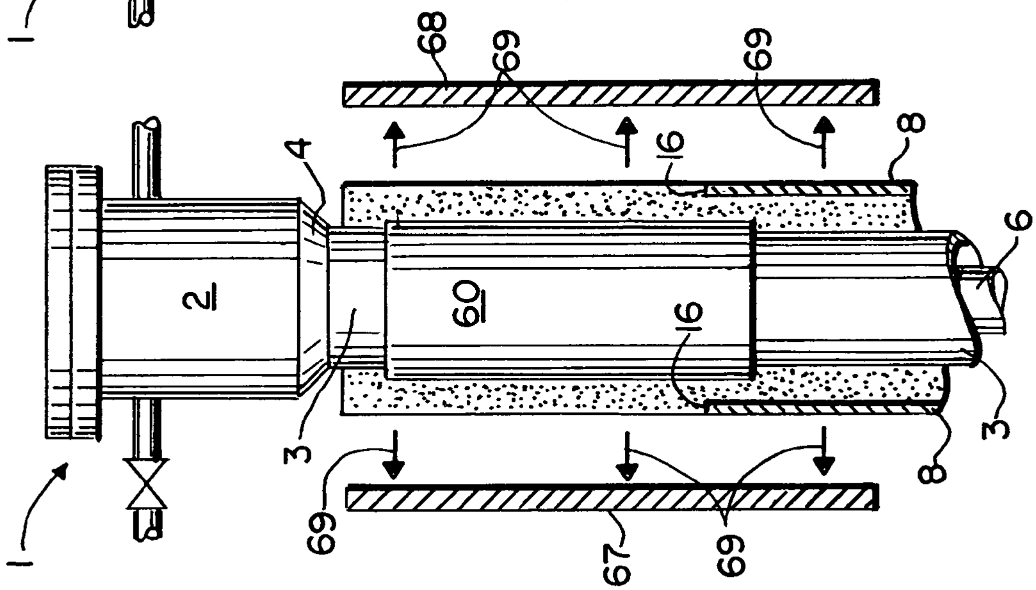
FIG. 14 is a partial sectional elevation view of the sixth embodiment of the method and apparatus of the present invention, illustrating a method step of the sixth embodiment.
Figure 13:
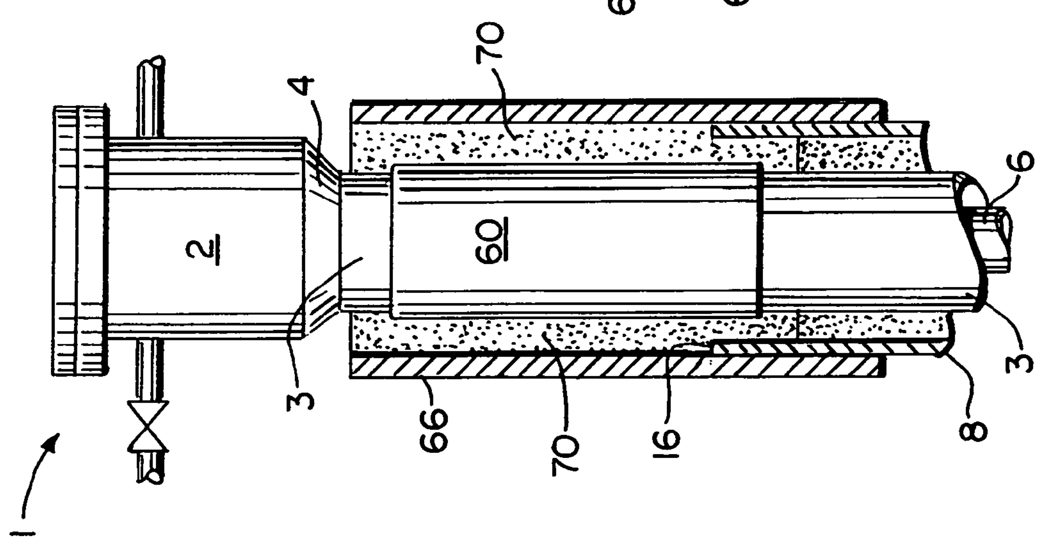
FIG. 13 is a partial sectional elevation view of the sixth embodiment of the method and apparatus of the present invention, illustrating a method step of the sixth embodiment.

FIGS. 13–15 show a sixth embodiment of the method and apparatus of the present invention.

Figure 1:
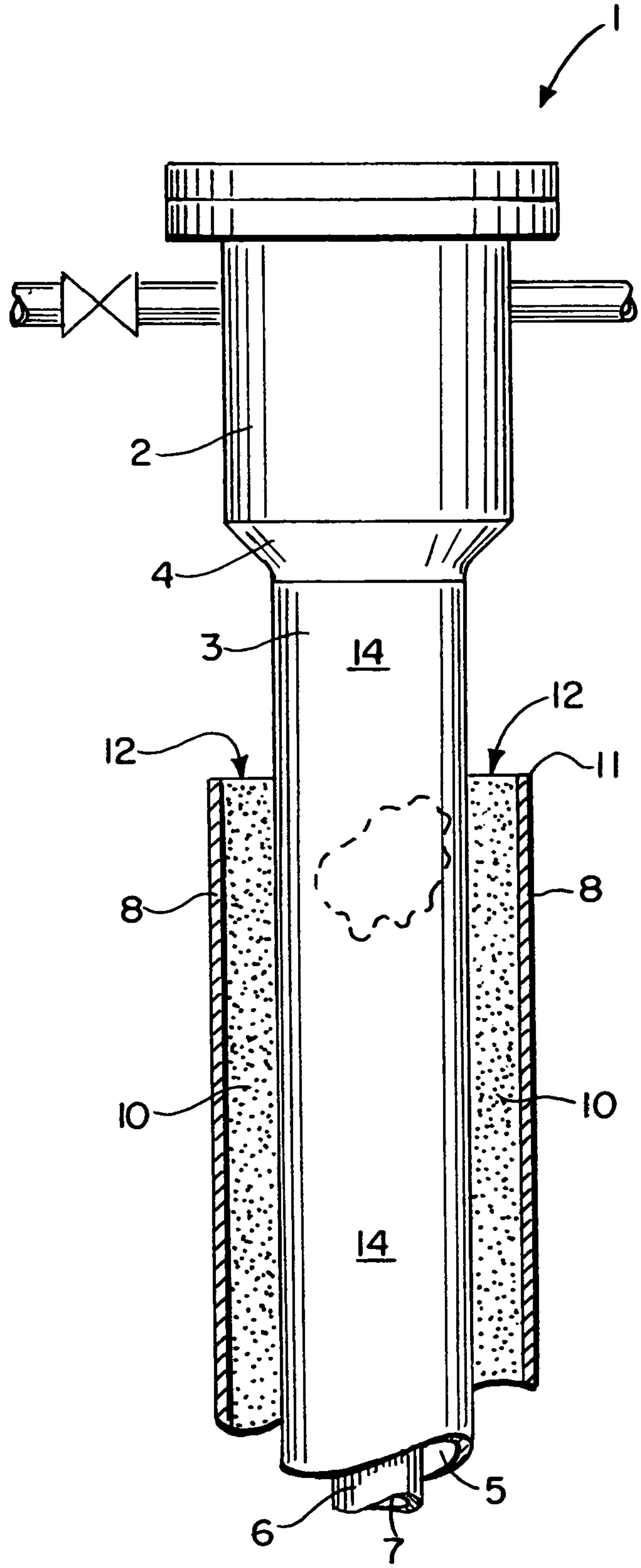
FIG. 1 is a partial sectional elevation view of the preferred embodiment of the method and apparatus of the present invention, illustrating a method step of the preferred method of the present invention.

In FIG. 1, a wellhead area 1 is shown that has a casing head assembly 2 of a gas or oil well. Connected to the casing head assembly 2 is a casing string 3. Flanges at the top of the casing head assembly 1 can accept either a blow out preventor (BOP) for drilling operations, or a wellhead/"christmas tree" for production. Inside the casing string 3 there is provided a casing string bore 5 that contains a production tubing or production flow line 6 having a production tubing bore 7. There can be a diameter transition section 4 between casing head assembly 2 and casing string 3 created by the weld securing the casing head 2 to the surface casing 3 or conductor.

Surrounding casing string 3 is an outer drive pipe 8. An annulus 9 is provided in between outer drive pipe 8 and casing string 3. The bore 5 of casing string 3 defines an annulus in between the production tubing or flow line 6 and surface casing string 3. This assembly of tube shaped members 3, 6, 8 can include additional cylindrically shaped conductors that are positioned in between the outer drive pipe 8 and casing string 3.

This assembly shown in FIG. 1 can also include a grout 10 that typically is positioned in annulus 9. Grout 10 can also be placed in the annulus 5 that is in between casing string 3 and inner production tubing 7.

Outer drive pipe 8 has an upper end 11 and an open top 12 that could have a trash cover in place. If grout 10 becomes damaged, or was never installed to an uppermost elevation next to casing head assembly 2, water can collect in the annulus 9 just below casing head assembly 2. It should be understood that in general, such a wellhead area 1 having casing head assembly 2, casing string 3, production tubing 7 and outer drive pipe 8 is an assembly that is well known in the art.

Because of the accumulation of or exposure to water in part of the annulus 9 that could be filled with grout 10, corrosion can produce a damaged portion 13 to casing string 3 (or to other conductor pipes) over a period of time. For example, this damaged portion 13 can be in the form of rust or corrosion on the outer surface 14 of the casing string 3.

Figure 2:
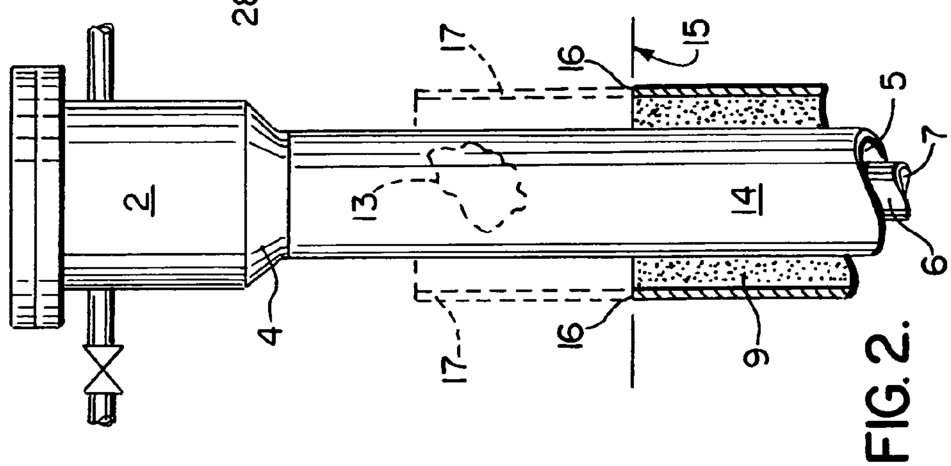
FIG. 2 is an elevation view of the preferred embodiment of the method and apparatus of the present invention, illustrating a method step of the present invention.

As part of the method, in FIG. 2 a cut 16 is made at the level of reference line 15 and below damaged portion 13. Any grout above reference line 15 is removed. The removed section 17 is shown on phantom lines in FIG. 2. A cut 16 is produced when a section 17 is removed.

Figure 3:
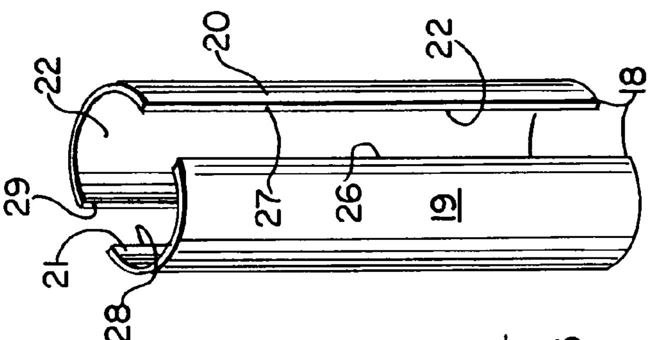
FIG. 3 is a partial perspective view of the preferred embodiment of the method and apparatus of the present invention and illustrating the inner sleeve portion.

In FIG. 3 there is a provided a sleeve 18 having half sections 19, 20 and inner surfaces 21, 22 respectively. This sleeve 18 is attached to the damaged section 13 of casing string 3 after it has been cleaned, sandblasted and/or water blasted to remove as much of the rust and corrosion as is possible.

Figure 4:
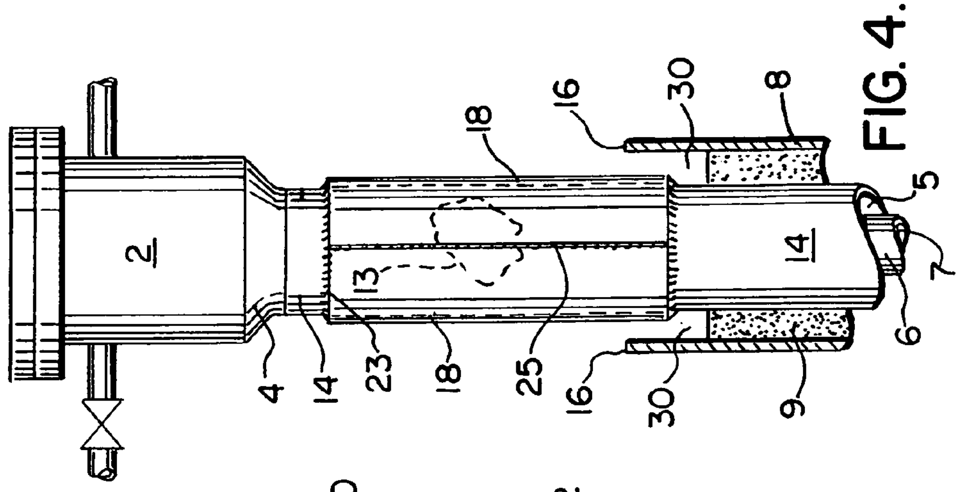
FIG. 4 is a partial sectional elevation view of the preferred embodiment of the method and apparatus of the present invention, illustrating a method step of the present invention.
Figure 5:
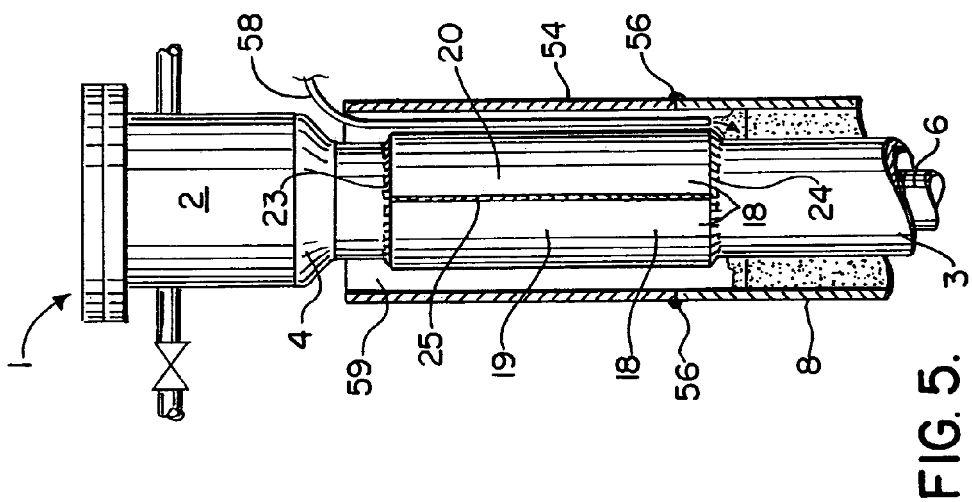
FIG. 5 is a partial sectional elevation view showing a second embodiment of the method and apparatus of the present invention, illustrating an alternate method step of the present invention.

Upper girth weld 23 and lower girth weld 24 are used to attach the sleeve 18 to casing string 3 at the position shown in FIG. 4. The upper girth weld 23 is above damaged portion 13. The lower girth weld 24 is below damaged portion 13.

Longitudinal welds 25 are used to connect the edges 26, 28 of half section 20 to edges 27, 29 of half section 22. This combination of girth welds 23, 24 and longitudinal welds 25 secures the sleeve 18 to the surface 14 of casing string 3.

Grout 10, if present below edge 16 is removed to provide a cavity 30 that communicates with the lower end portion of sleeve 18 as shown in FIG. 4. The grout is removed sufficiently to provide access for making the lower weld 24 and to place new grout if desired. The upper cut edge 16 should be at a level that enables weld 24 to be made.

Figure 8:
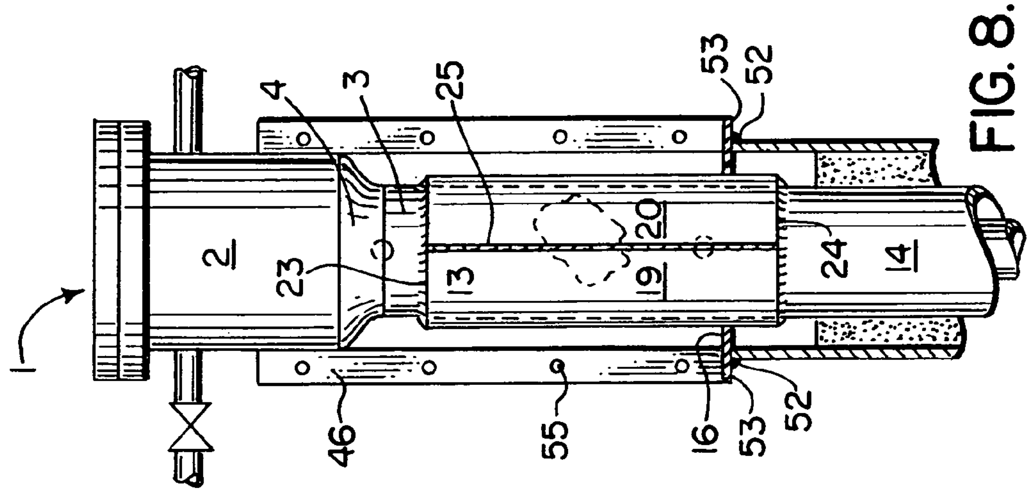
FIG. 8 is a partial sectional elevation view of the third embodiment of the method and apparatus of the present invention, illustrating a method step of the present invention.
Figure 7:
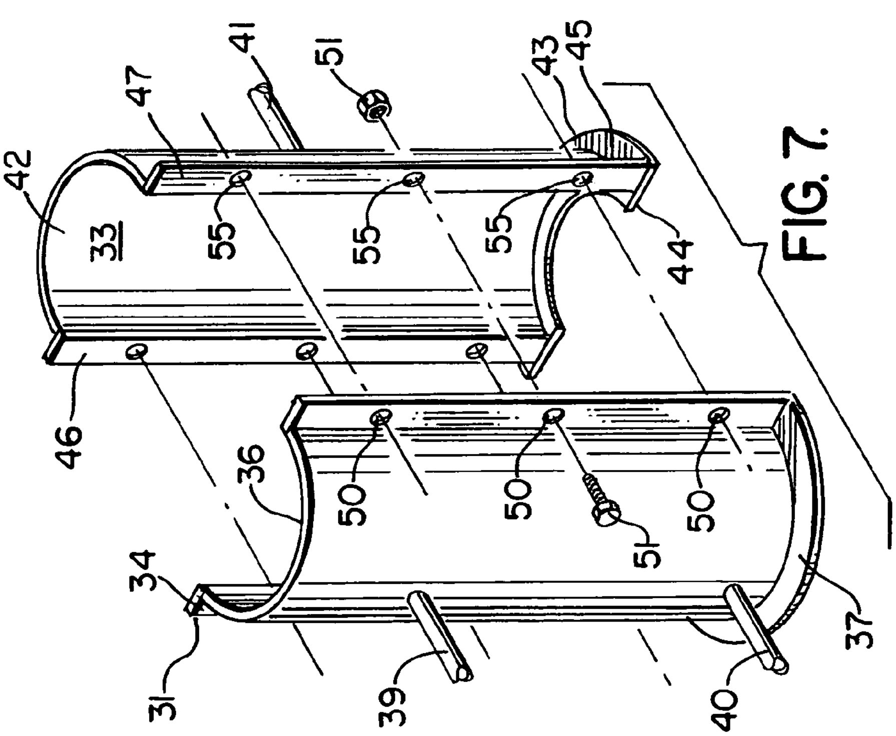
FIG. 7 is a partial perspective view of a third embodiment of the method and apparatus of the present invention.
Figure 10:
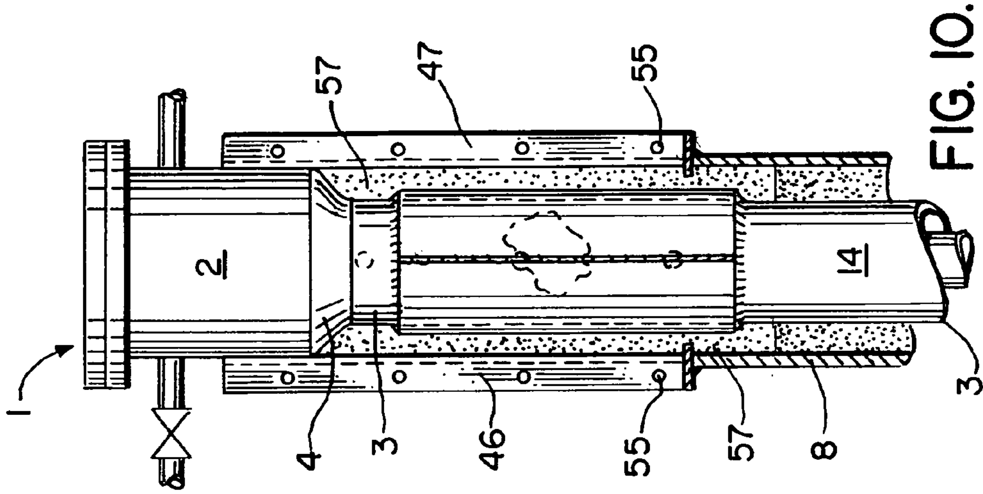
FIG. 10 is a partial sectional elevation view of the third embodiment of the method and apparatus of the present invention, illustrating a method step of the third embodiment of the present invention.
Figure 9:
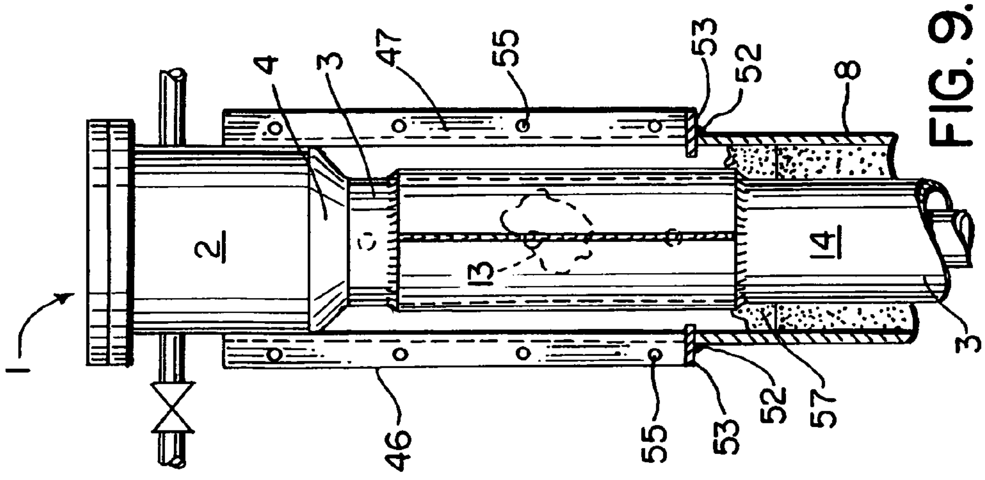
FIG. 9 is a partial sectional elevation view of the third embodiment of the method and apparatus of the present invention, illustrating a method step of the present invention.

In FIG. 7, a second sleeve 31 is shown that can be installed as shown in FIGS. 8, 9 and 10 by connecting the sleeve 31 to the upper end portion of outer drive pipe 8 at cut 16. The second sleeve 31 can be formed of two half sections 32, 33.

Each half section 32, 33 is preferably provided with a pair of longitudinally extending flanges. The first half section 32 has longitudinally extending, opposed flanges 34, 35. The second half section 33 has longitudinally extending flanges 46, 47. Each half section 32, 33 includes a curved portion. The half section 32 has curved portion 36. The half section 33 has curved portion 42.

A lower most flange 37 is an arc shaped flange fastened to the bottom of half section 32. Each of the longitudinally extending flanges 34, 35 is provided with a plurality of openings 50 that can receive bolted fasteners 51. Likewise, the longitudinally extending flanges 46, 47 of half section 33 provide openings 55 that can receive bolted fasteners 51.

The lower end portion of half section 33 has a curved or arc shaped flange 43. Each of the curved or arc shaped flanges 37, 43 can have inner and outer parts such as the inner part 44 and the outer part 45 shown in FIG. 7 for the flange 43. Each of the arc shaped flanges 37, 43 has a lower surface 53 that can be welded at 52 for joining the lower flange 37 or 43 to the upper edge or cut 16 part of the outer drive pipe 8.

A plurality of injection ports 39, 40, 41 are provided on sleeve 31 half sections 32, 33. The sleeve half section 32 has injection ports 39, 40. The sleeve half section 33 has an injection port 41.

In FIG. 8, the second sleeve 31 is shown attached to outer drive pipe 8 at upper cut edge 16 using girth weld 52. A grout product 57 (for example, epoxy, polymeric, or cement grout) can be pumped into the space in between the second sleeve 31 and the combination of first sleeve 18 and casing string 3, the completed repair being shown in FIG. 10.

In the embodiment of FIGS. 7–10, axial load and moment transfer is accomplished with the sleeves 18, 31 and grout product 57.

In FIGS. 5 and 6, a sleeve 54 is similar to the sleeve 31 of FIGS. 7–10. Sleeve 54 can be made of two half sections and then welded together in the position of FIGS. 5–6. However, the sleeve 54 is welded at circumferential weld 56 to upper cut 16 edge of the outer drive pipe 8 as shown in FIGS. 5 and 6. The space in between the sleeve 54 that is welded at 56 to upper drive pipe 8 can be filled using flow line 58 pumping a grout product into the space 59 such as a polymer, epoxy, or cement grout. This method of FIGS. 5 and 6 can also be used to restore a cut away section of an inner conductor or surface casing.

In FIG. 11, a composite sleeve 60 is placed around the damaged section 13 of surface casing or conductor 3. Grout product 57 can be placed as a watershed or for corrosion protection in between the sleeve 60 and the outer pipe 8 up to the top of outer drive pipe 8 at the cut edge 16.

In FIG. 12, a jacket 62 (e.g. composite) can be added as a second sleeve to restore the drive pipe 8. The jacket 62 is spaced from the outer drive pipe 8 using spacer 63. The composite jacket 62 is spaced from the first sleeve 60 using spacers 61. A lower seal 64 is placed in between the bottom of jacket 62 and outer drive pipe 8 as shown in FIG. 12. One or more injection ports 65 can be provided for pumping a grout product 57 into the space that is in between the second sleeve or outer jacket 62 and first sleeve 60 and existing drive pipe 8.

In FIGS. 13, 14 and 15, a sleeve 60 is placed over the damaged portion 13 of the casing string 3. A mold 66 is then placed against the outer surface of outer drive pipe 8 as shown in FIG. 13. A concrete cylinder 70 is then formed that encircles both casing string 3 and repair sleeve 60 as shown in FIG. 13. In FIG. 14, the mold 66 is removed by separating mold halves 67, 68 as indicated by the arrows 69. The concrete cylinder 70 can then be covered with a cylindrically shaped composite sleeve 71 as shown in FIG. 15. The sleeve 71 can be formed (field applied) in place using a combination of reinforcing material and resin, for example.

PARTS LIST

The following is a list of suitable parts and corresponding parts descriptions for the various parts used in this specification.

PART NO. DESCRIPTION
1 wellhead area
2 casing head assembly
3 surface casing or conductor
4 transition (connection weld)
5 casing string bore
6 production tubing/casing
7 production tubing bore
8 outer drive pipe
9 annulus
10 grout
11 upper end
12 open top
13 damaged portion
14 outer surface
15 reference line
16 cut
17 removed section
18 sleeve or curved repair member
19 half section
20 half section
21 inner surface
22 inner surface
23 upper girth weld
24 lower girth weld
25 longitudinal weld
26 edge
27 edge
28 edge
29 edge
30 cavity
31 sleeve
32 half section
33 half section
34 flange
35 flange
36 curved portion
37 flange
38 opening
39 injection port
40 injection port
41 injection portion
42 curved portion
43 flange
44 inner pant
46 flange
47 flange
48 curved part
50 opening
51 bolted fastener
52 girth weld
53 lower surface
54 sleeve/sleeve half section
55 opening
56 weld
57 grout
58 flow line
59 space
60 composite sleeve
61 spacer
62 composite jacket
63 spacer
64 lower seal
65 injection port
66 mold
67 mold half
68 mold half
69 arrow
70 concrete cylinder
71 composite sleeve The foregoing embodiments are presented by way of example only; the scope of the present invention is to be limited only the following claims.

What is claimed is:

1. A method of repairing an oil and gas well having a platform that has an outer drive pipe, an inner production flow line, and one or more intermediate casings or conductors having at least one having a damaged section, comprising the steps of:

a) removing a section of the drive pipe to provide an upper edge and to expose the damaged section;

b) installing a curved repair member on the casing that spans between upper and lower positions that are above mid below the damaged section;

c) welding a first repair member to the casing with a girth weld; and d) welding a second repair member to the upper edge of the drive pipe with a girth weld.

2. The method of claim 1 wherein the first repair member is a sleeve comprised of two sleeve sections defining two slots there between and further comprising step "e" welding the sleeve sections together so that both of the slots are closed with a longitudinal welded connection.

3. The method of claim 2 wherein the sleeve is metallic.

4. The method of claim 2 wherein the sleeve has at least one longitudinal flange at the slot and in step "e" the longitudinal weld connects to the longitudinal flange.

5. The method of claim 2 wherein each sleeve section has a longitudinal flange and in step "c" a longitudinal weld connects the longitudinal flange on one sleeve section to the other sleeve section.

6. The method of claim 2 wherein each of the sleeves has two longitudinal flanges and in step "c" each longitudinal connection connects two longitudinal flanges together.

7. The method of claim 1 wherein the first repair member is a sleeve is of a non-metallic material and in steps "c" and "d" the sleeve is connected to the casing or conductor.

8. The method or claim 7 wherein the repair member is of a composite material.

9. The method of claim 1 wherein one of the repair members includes a sleeve that has a cylindrical portion and at least one annular flange at one end portion of the sleeve and the sleeve is welded at the annular flange to one of the casing, conduit or drive pipe with a girth weld.

10. The method of claim 9 wherein there are two sleeves.

11. The method of claim 10 wherein one of the sleeves has a cylindrical portion and an annular flange at one end portions of the sleeve, and further comprising welding each the annular flange to an edge with a girth weld.

12. The method of claim 11 wherein each of the sleeves has a longitudinal flange and in step "e" the longitudinal connection connects the longitudinal flange on one sleeve section to the other sleeve section.

13. The method of claim 12 wherein a grout filler is added after the sleeve is welded into position.

14. The method of claim 11 wherein each of the sleeves has two longitudinal flanges and in step "c" each longitudinal connection connects two longitudinal flanges together.

15. The method of claim 11 wherein there is a void space between the repair member and inner casing and further comprising filling the void space between the sleeve and inner casing with a grout filler.

16. The method of claim 11 wherein one of the sleeves has a longitudinally extending connection is a bolted connection.

17. The method of claim 11 wherein one of the sleeves has a longitudinally extending connection that is a welded connection.

18. The method of claim 10 wherein each of the sleeves has a longitudinal flange and in step "e" the longitudinal connection connects the longitudinal flange on one sleeve section to the other sleeve section.

19. The method of claim 18 wherein a grout filler is added after the sleeve is welded into position.

20. The method of claim 10 wherein each of the sleeves has two longitudinal flanges and in step "c" each longitudinal connection connects two longitudinal flanges together.

21. The method of claim 20 wherein a grout filler is added after the sleeve is welded into position.

22. The method of claim 9 wherein there is a void space between the repair member and inner casing and further comprising filling the void space between the sleeve and inner casing with a grout filler.

23. The method of claim 9 wherein one of the sleeves has a longitudinally extending connection that is a welded connection.

24. The method of claim 1 wherein there is avoid space between the repair member and inner casing and further comprising filling the void space between the repair member and inner casing with a grout filler material.

25. The method of claim 1 wherein the first repair member is secured in position along a longitudinally extending connection.

26. The method of claim 25 wherein the longitudinally extending connection is a welded connection.

27. The method of claim 25 wherein the longitudinally extending connection is a bolted connection.

28. A method of repairing an offshore oil well having a platform with an oil well that has a larger diameter drive pipe, a smaller diameter inner casing string inside the outer drive pipe having a damaged section, and a production flow line inside the inner casing string, comprising the steps of:

a) removing a section of the outer drive pipe to provide an upper edge;

b) installing a sleeve on the casing string that spans between upper and lower positions on the casing string and covers the damaged section, the sleeve having a longitudinal slot that enables it to be opened for installing the sleeve around the casing string;

c) welding the sleeve to the casing string with a pair of girth welds; and d) closing the sleeve slot with a longitudinally extending connection.

29. A method of structurally reinforcing an oil well that has an assembly of tubular members in a marine environment, the assembly including a smaller diameter flowline inside of a larger diameter casing string that has a damaged portion, the casing string being inside an outer tubular member, comprising the steps of:

a) providing a first annulus in between the flow casing and casing string;

b) providing a second annulus in between the casing string and outer tubular member;

c) removing a section of the outer tubular member to expose the damaged portion;

d) covering the damaged portion of the casing string with a repair sleeve;

e) attaching the sleeve to the casing string above and below the damaged portion of the casing string with upper and lower attachments, at least one of said attachments being a girth weld that attaches a bottom part of the sleeve to the casing string; and f) pumping a volume of a rout product into the second annulus.

30. The method of claim 29 wherein the sleeve is non-metallic.

31. The method of claim 29 further comprising the step of attaching a second sleeve to the assembly.

32. The method of claim 31 wherein the second sleeve is attached to the outer tubular member.

33. The method of claim 31 further comprising adding grout to one annulus.

34. The method of claim 33 wherein the grout is a polymer grout.

35. The method of claim 33 wherein the grout is a cement grout.

36. The method of claim 33 wherein the grout is an epoxy grout.

37. The method of claim 31 wherein the second sleeve comprises of two sleeve sections that have longitudinal flanges that enable the second sleeve to be bolted to the assembly.

38. A method of structurally reinforcing an oil well that has an assembly of tubular members in a marine environment, the assembly including a smaller diameter flowline inside of a larger diameter casing string that has a damaged portion, the casing string being inside an outer tubular member, comprising the steps of:

a) providing a first annulus in between the flow casing and casing string;

b) providing a second annulus in between the casing string and outer tubular member;

c) removing a section of the outer tubular member to expose the damaged portion;

d) covering the damaged portion of the casing string with a repair sleeve;

e) attaching the sleeve to the casing string above and below the damaged portion of the casing string with upper and lower attachments, at least one of said attachments being a girth weld that attaches a bottom part of the sleeve to the casing string; and f) pumping a volume of a rout product into the second annulus;

g) wherein the sleeve is metallic section of differing respective diameters.

39. A method of structurally reinforcing an oil well that has an assembly of tubular members in a marine environment, the assembly including a smaller diameter flowline inside of a larger diameter casing string that has a damaged portion, the casing string being inside an outer tubular member, comprising the steps of:

a) providing a first annulus in between the flow casing and casing string;

b) providing a second annulus in between the casing string and outer tubular member;

c) removing a section of the outer tubular member to expose the damaged portion;

d) covering the damaged portion of the casing string with a repair sleeve;

e) attaching the sleeve to the casing string above and below the damaged portion of the casing string with upper and lower attachments, at least one of said attachments being a girth weld that attaches a bottom part of the sleeve to the casing string; and f) pumping a volume of a rout product into the second annulus g) attaching a second sleeve to the assembly;

h) adding grout to each annulus.

* * * * *